(12) United States Patent
Huang

(10) Patent No.: US 11,555,320 B2
(45) Date of Patent: Jan. 17, 2023

(54) DRAINAGE DEVICE FOR ABOVE-GROUND POOL AND ABOVE-GROUND POOL

(71) Applicant: BESTWAY INFLATABLES & MATERIAL CORP., Shanghai (CN)

(72) Inventor: Shuiyong Huang, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 0 days.

(21) Appl. No.: 17/244,544

(22) Filed: Apr. 29, 2021

(65) Prior Publication Data

US 2021/0363768 A1  Nov. 25, 2021

(30) Foreign Application Priority Data

May 20, 2020 (CN) .......................... 202020848510.5

(51) Int. Cl.
*E04H 4/12* (2006.01)
*E04H 4/00* (2006.01)

(52) U.S. Cl.
CPC .......... *E04H 4/1236* (2013.01); *E04H 4/0018* (2013.01)

(58) Field of Classification Search
CPC .... E04H 4/1236; E04H 4/1209; E04H 4/0018
USPC .......................................................... 4/507
See application file for complete search history.

(56) References Cited

U.S. PATENT DOCUMENTS

| 2,838,768 A | * | 6/1958 | Fischett ................. A47K 1/14 |
| | | | 297/DIG. 8 |
| 5,826,855 A | * | 10/1998 | Dick ..................... E04H 4/0018 |
| | | | 137/315.27 |
| 6,192,528 B1 | * | 2/2001 | Martinez ............... E04H 4/1236 |
| | | | 4/507 |
| 2015/0135424 A1 | | 5/2015 | Lin et al. |

FOREIGN PATENT DOCUMENTS

| CN | 209742440 | 12/2019 |
| EP | 0078593 | 5/1983 |
| GB | 2184193 | 6/1987 |

OTHER PUBLICATIONS

Extended European Search Report dated Dec. 2, 2021 (Dec. 2, 2021) issued by the European Patent Office on related European patent application 21171414.2.

\* cited by examiner

*Primary Examiner* — Huyen D Le
(74) *Attorney, Agent, or Firm* — Dickinson Wright PLLC

(57) ABSTRACT

A drainage device for an above-ground pool, and an above-ground pool including the drainage device are provided. The drainage device includes a drainage pipe, with inlet and outlet ends, and a drainage valve connected to the inlet end of the drainage pipe. The drainage valve includes a water inlet periphery, defining a water inlet in fluid communication with the inlet end of the drainage pipe, and a connecting member disposed circumferentially around the water inlet periphery. The connecting member is radially spaced apart from the water inlet periphery. The connecting member may be formed by injection molding around the water inlet periphery.

11 Claims, 7 Drawing Sheets

DRAINAGE DEVICE FOR ABOVE-GROUND POOL AND ABOVE-GROUND POOL

CROSS-REFERENCE TO RELATED APPLICATION

This Application claims priority from Chinese patent Application CN202020848510.5 filed May 20, 2020 in China, the disclosure of which is incorporated herein by reference in its entirety.

BACKGROUND

1. Field

Apparatuses and methods consistent with exemplary embodiments relate to a drainage device for an above-ground pool, and an above-ground pool having the drainage device.

2. Description of the Related Art

Above-ground pools generally include inflatable pools and frame pools, among other types, and are widely loved due to convenient installation and use. An important part of an above-ground pool is a drainage device which is usually installed at a bottom of the pool for draining water therefrom. For example, a drainage device is often installed at a bottom of a cavity defining the inside of the pool and discharges water from the pool through a drainage pipe and a drainage valve fixed to the pool bottom. However, practically speaking, it has been found that with a drainage device including an inflexible drainage pipe made of a hard material, direct contact between the drainage pipe and the ground or between the drainage pipe and the pool bottom may cause damage to the drainage pipe and/or the pool bottom, thereby shortening the effective life of the drainage device and/or pool. In addition, an inflexible drainage pipe cannot be bent and is therefore inconvenient to pack and ship, resulting in an increased cost. Furthermore, a drainage valve may be integrally formed at a drainage inlet of an existing drainage pipe. For example an overmolded connection part may be formed at an edge of the drainage inlet by injection molding. Such an overmolded part is generally fixed to the pool bottom by high-frequency welding or bonding, and the drainage inlet is closed by a sealing plug. However, when high-frequency welding is used, the overmolded part near the drainage inlet may cause deformation of the drainage inlet, so that the drainage inlet and the sealing plug cannot completely seal, resulting in water leakage. Accordingly, a drainage device including a drainage inlet which does not deform is desired.

SUMMARY

One or more example embodiments may address at least the above problems and/or disadvantages and other disadvantages not described above. Also, example embodiments are not required to overcome the disadvantages described above, and may not overcome any of the problems described above.

One or more example embodiments may provide a drainage device which facilitates prevention of deformation of a drainage inlet when connected to a pool bottom. One or more example embodiments may include a drainage device having a certain bendability, thereby reducing a package size and the cost.

According to an aspect of an example embodiment, a drainage device for an above-ground pool may comprise: a drainage pipe having an inlet end and an outlet end; and a drainage valve, connected to the inlet end of the drainage pipe. The drainage valve may comprise: a water inlet periphery defining a water inlet in fluid communication with the inlet end of the drainage pipe, and a connecting member disposed circumferentially around the water inlet periphery, such that the connecting member is radially spaced apart from the water inlet periphery.

The connecting member may be formed by injection molding around the water inlet periphery.

The drainage device may further comprise: a drainage pipe connector having an inlet end configured to be connected to the outlet end of the drainage pipe and an outlet end opposite the inlet end.

The drainage device may further comprise: a drainage pipe holder connected to the inlet end of the drainage pipe, the drainage pipe holder formed of a material having a hardness greater than a hardness of the drainage pipe; the drainage pipe holder comprising: a base configured to accommodate therein the water inlet, and a plug plate fixing the water inlet to the base.

The plug plate may extend in a direction substantially parallel to a length of the drainage pipe and may be fitted to the base in an insertion direction substantially parallel to the length of the drainage pipe. One of the plug plate and the base may comprise an insertion groove extending in the insertion direction, and another of the plug plate and the base may comprise a protruding strip extending in the insertion direction.

The plug plate may extend in a direction substantially perpendicular to a length of the drainage pipe and may be fitted to the base in an insertion direction substantially perpendicular to the length of the drainage pipe. One of the plug plate and the base may comprise a snap groove extending in the insertion direction, and another of the plug plate and the base may comprises a snap fastener extending in the insertion direction.

The drainage device may further comprise a reinforcing member disposed within the drainage pipe and extending in a lengthwise direction along a length of an inner wall of the drainage pipe. The reinforcing member may comprise a rib integrally formed with the inner wall of the drainage pipe, the rib protruding radially inward from the inner wall of the drainage pipe. The reinforcing member may comprise a plurality of evenly-spaced ribs protruding inward from the inner wall of the drainage pipe. The reinforcing member may comprise a supporting pipe embedded in the inner wall of the drainage pipe, wherein a hardness of the supporting pipe is greater than a hardness of the drainage pipe.

According to an aspect of another example embodiment, a drainage device for an above-ground pool may comprise: a flexible drainage pipe having an inlet end and an outlet end; and a reinforcing member disposed within the drainage pipe and extending in a lengthwise direction along a length of the drainage pipe.

The reinforcing member may comprise a rib integrally formed with the inner wall of the drainage pipe, the rib protruding radially inward from the inner wall of the drainage pipe. The reinforcing member may comprise a plurality of evenly-spaced ribs protruding inward from the inner wall of the drainage pipe. The reinforcing member may comprise a supporting pipe embedded in the inner wall of the drainage pipe, wherein a hardness of the supporting pipe is greater than a hardness of the drainage pipe.

The drainage device may further comprise: a drainage valve, connected to the inlet end of the drainage pipe, the drainage valve comprising: a water inlet periphery defining a water inlet in fluid communication with the inlet end of the drainage pipe, and a connecting member disposed circumferentially around the water inlet periphery, such that the connecting member is radially spaced apart from the water inlet periphery.

The connecting member may be formed by injection molding around the water inlet periphery.

The drainage device may further comprise: a drainage pipe connector having an inlet end configured to be connected to the outlet end of the drainage pipe and an outlet end opposite the inlet end.

The drainage device may further comprise: a drainage pipe holder connected to the inlet end of the drainage pipe, the drainage pipe holder formed of a material having a hardness greater than a hardness of the drainage pipe; and the drainage pipe holder comprising: a base configured to accommodate therein the water inlet, and a plug plate fixing the water inlet to the base. The plug plate may extend in a direction substantially parallel to a length of the drainage pipe and be fitted to the base in an insertion direction substantially parallel to the length of the drainage pipe, and one of the plug plate and the base may comprise an insertion groove extending in the insertion direction, while another of the plug plate and the base may comprise a protruding strip extending in the insertion direction.

The plug plate may extend in a direction substantially perpendicular to a length of the drainage pipe and may be fitted to the base in an insertion direction substantially perpendicular to the length of the drainage pipe, and one of the plug plate and the base may comprise a snap groove extending in the insertion direction, while another of the plug plate and the base may comprise a snap fastener extending in the insertion direction.

According to an aspect of another example embodiment, an above-ground pool may comprise a pool bottom, a pool wall surrounding the pool bottom, the pool wall and the pool bottom together defining a water cavity, and a drainage device as described according to one or more of the example aspects and example embodiments above.

BRIEF DESCRIPTION OF THE DRAWINGS

The above and/or other aspects and advantages will become apparent and more readily appreciated from the following description of example embodiments, taken in conjunction with the accompanying drawings in which:

FIG. 1b is a schematic cross-sectional diagram of the above-ground pool shown in FIG. 1a;

FIG. 3b is an enlarged schematic diagram of a drainage pipe holder shown in FIG. 3a;

FIG. 4b is a schematic cross-sectional diagram along a line A-A of FIG. 4a;

FIG. 5b is a schematic cross-sectional diagram along a line B-B of FIG. 5a;

FIG. 8b is a schematic cross-sectional diagram along a line C-C of FIG. 8a;

FIG. 9b is a schematic cross-sectional diagram along a line D-D of FIG. 9a;

FIG. 10b is a schematic cross-sectional diagram along a line E-E of FIG. 10a; FIG. 11b is a schematic cross-sectional diagram along a line F-F of FIG. 11a.

DETAILED DESCRIPTION

Figure 1A:
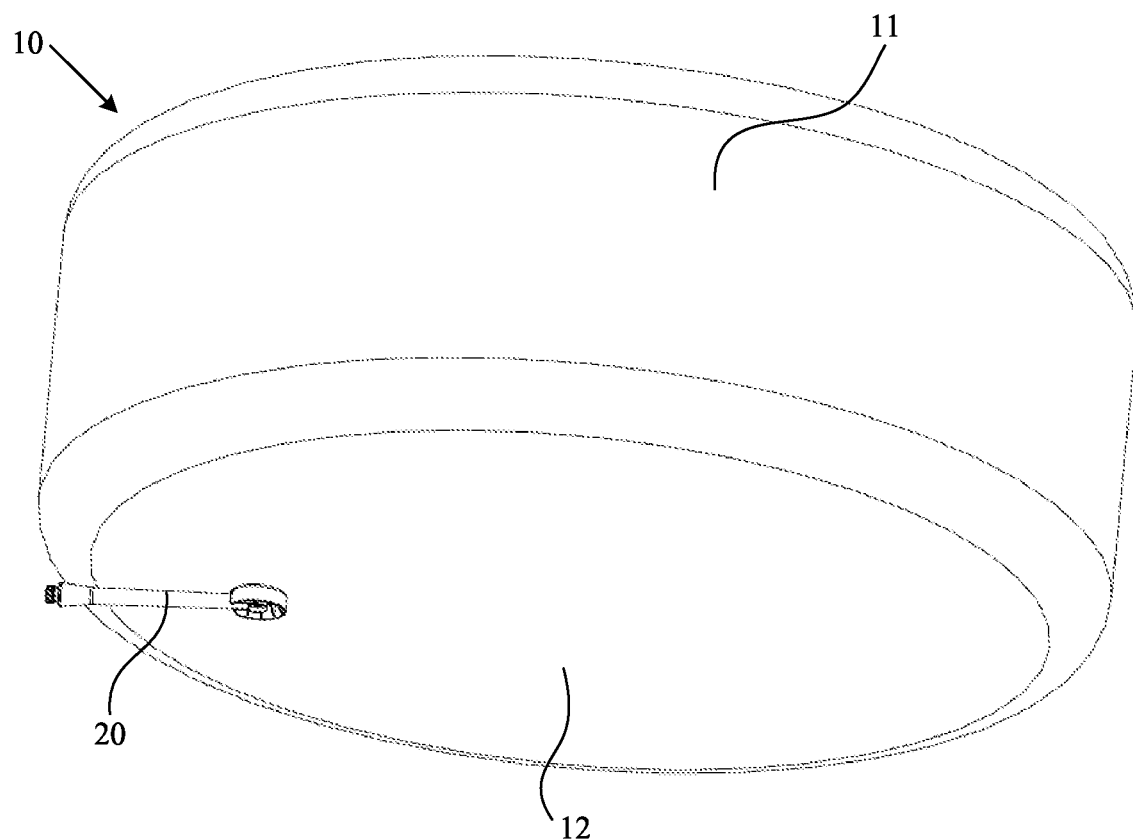
FIG. 1a is a schematic diagram of an above-ground pool as viewed from the bottom, according to an example embodiment.

Reference will now be made in detail to exemplary embodiments which are illustrated in the accompanying drawings, wherein like reference numerals refer to like elements throughout. In this regard, the exemplary embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list. In addition, the terms such as "unit," "-er (-or)," and "module" described in the specification refer to an element for performing at least one function or operation, and may be implemented in hardware, software, or the combination of hardware and software.

Various terms are used to refer to particular system components. Different companies may refer to a component by different names—this document does not intend to distinguish between components that differ in name but not function.

Matters of these example embodiments that are obvious to those of ordinary skill in the technical field to which these exemplary embodiments pertain may not be described here in detail.

In this description, an inflatable pool is provided as an example of an above-ground pool. However, it should be understood that example embodiments described herein are not limited to an inflatable pool. Any other type of above-ground pool may be used including, but not limited to a frame pool. Furthermore, while a circular pool shape is shown in the figures and discussed herein, the pool may be of any shape, as would be understood by one of skill in the art, including, but not limited to an oval pool, a rectangular pool, and another polygonal pool.

Figure 1B:
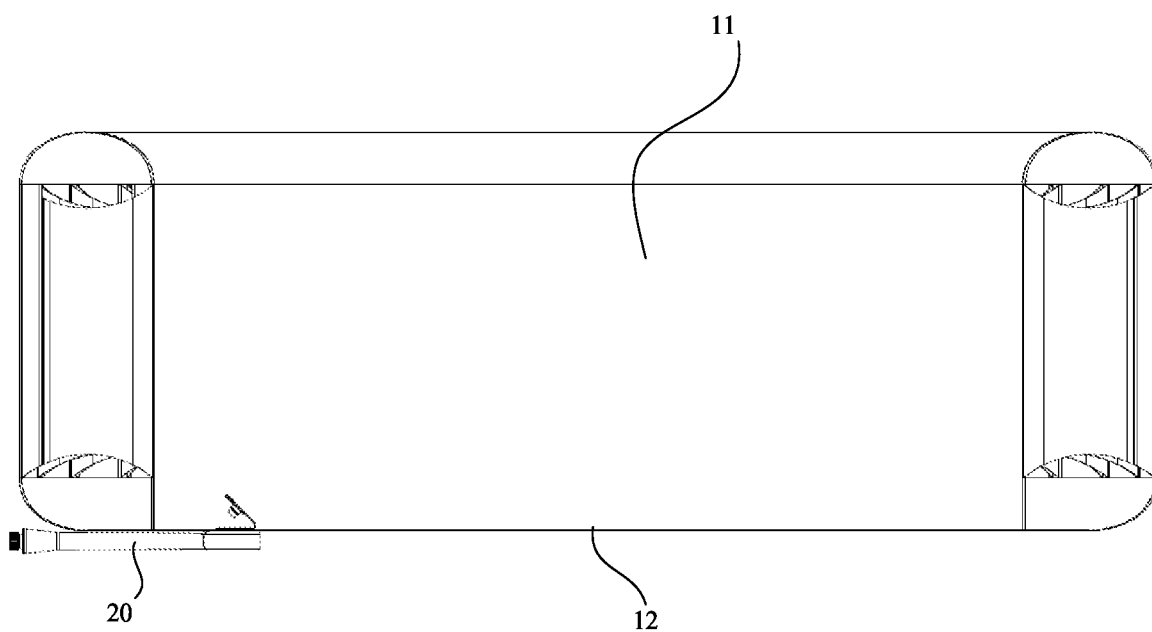
Figure 2A:
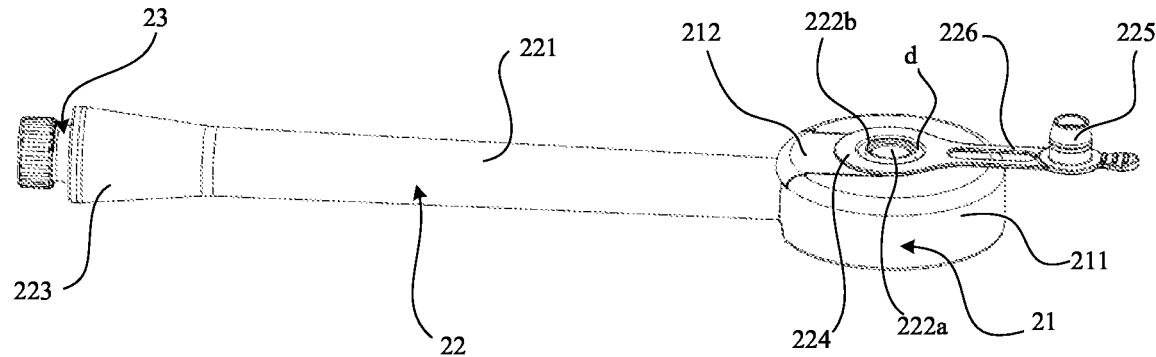
FIG. 2a is an external schematic diagram of a drainage device according to an example embodiment.
Figure 2B:
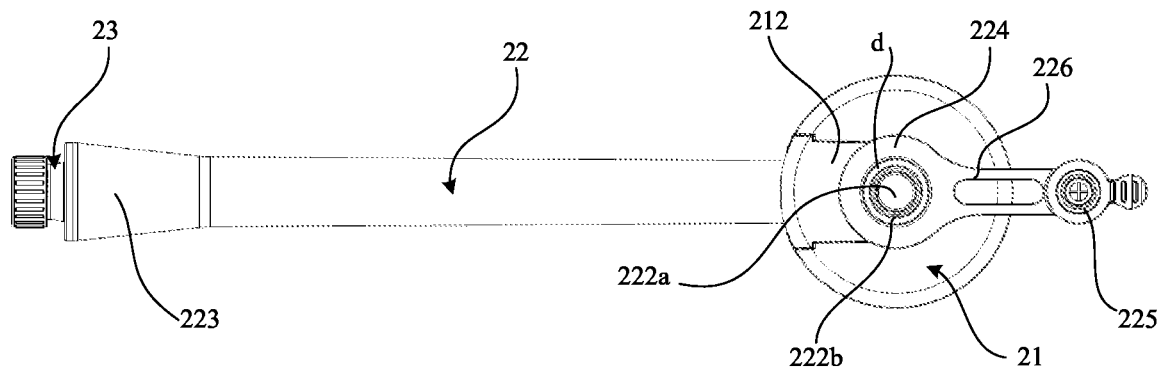
FIG. 2b is a top schematic diagram of the drainage device shown in FIG. 2a, FIG. 2c is an exploded schematic diagram of the drainage device shown in FIG. 2a, and FIG. 2d is an enlarged schematic diagram of a drainage pipe holder shown in FIG. 2c.
Figure 2C:
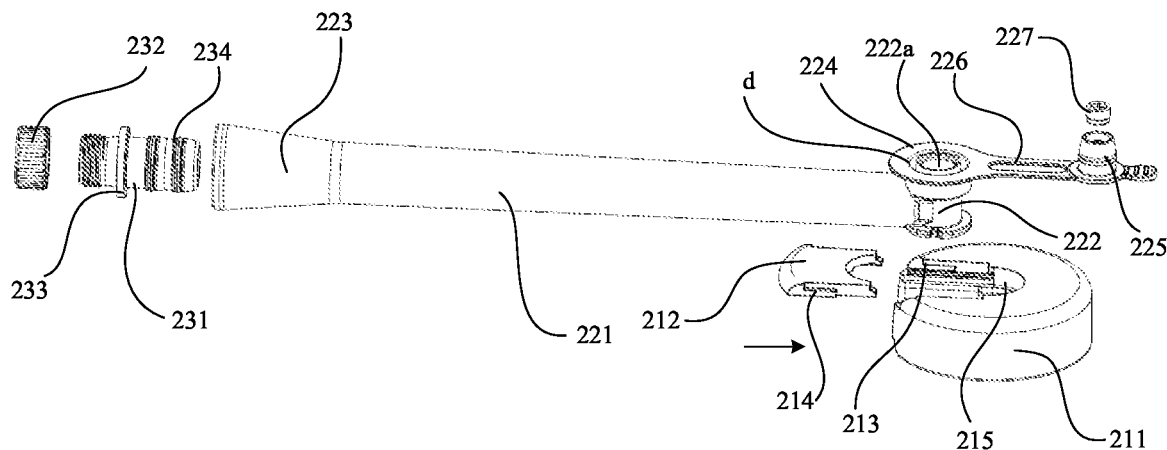
Figure 2D:
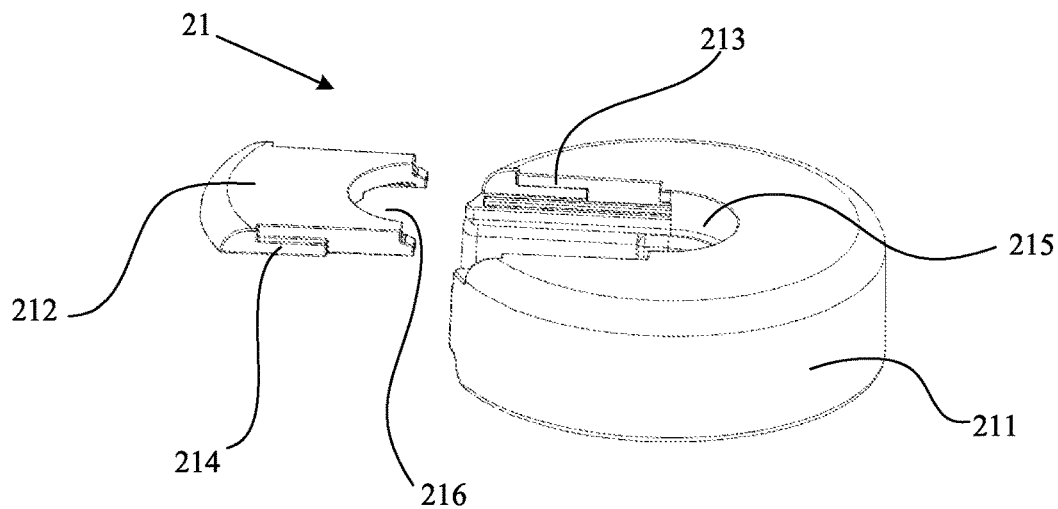

As can be seen in FIGS. 1a and 1b, a drainage device 20 is disposed at a pool bottom 12 of an above-ground pool 10. With reference to FIGS. 2a to 3b, the drainage device 20 comprises a drainage pipe 22, a drainage pipe holder 21, and a drainage pipe connector 23. The drainage pipe 22 has a hollow pipe body 221 with an inlet end 222 that can be connected to the pool bottom 12 for receiving water from the pool and an outlet end 223 for discharging water therefrom. The drainage pipe holder 21 is disposed at and supports the inlet end of the pipe body 221, and the drainage pipe connector 23 adapted to connect to the outlet end 223 of the pipe body 221. For example, the drainage pipe connector 23 and the outlet end 223 of the pipe body may each include threading to enable them to be screwed together or may be configured to be connected in another way, as would be understood by one of skill in the art, such as by pressure fitting or snapping together. As shown in FIGS. 2a-2c, the outlet end 223 of the drainage pipe 22 may widen from a narrow end to a wider opening sized to receive the drainage pipe connector 23 therein.

Figure 6:
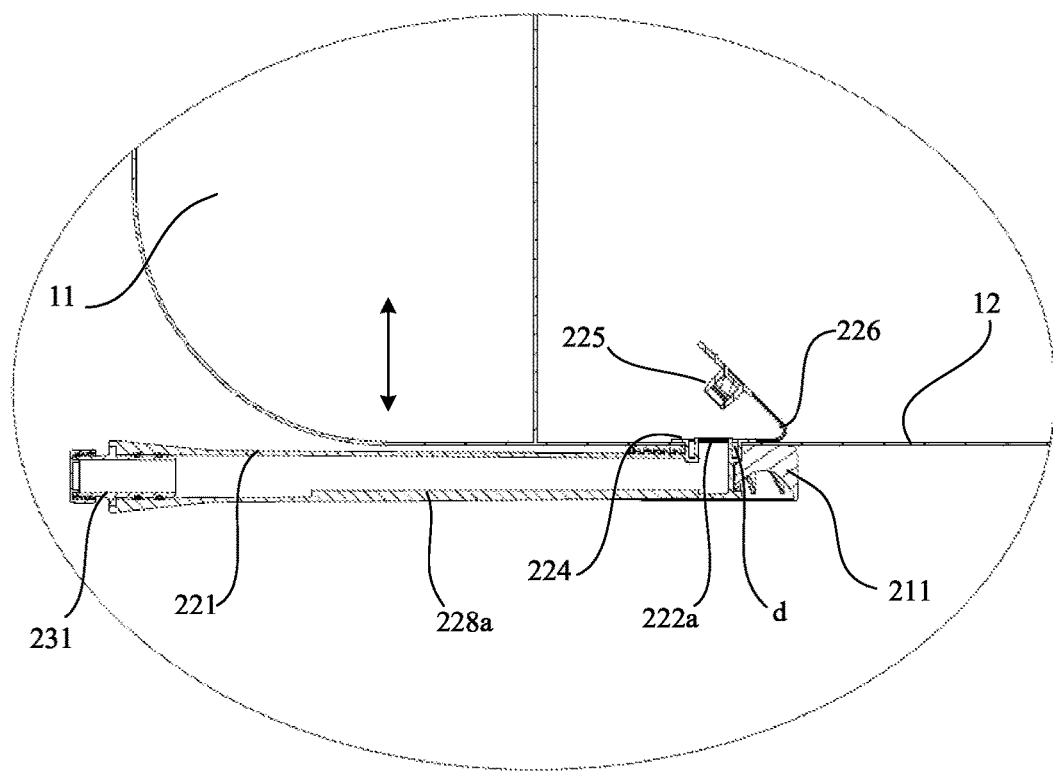
FIG. 6 is a schematic partial cross-sectional diagram of the drainage device shown in FIG. 5a as applied to an above-ground pool.

The inlet end 222 includes a water inlet opening 222a which opens in a direction substantially perpendicular to a length of the pipe body 221. A water inlet periphery 222b defines the opening of the water inlet 222a, and a connecting member 224 is formed by injection molding and comprises a flange disposed circumferentially around the opening of the water inlet periphery 222b. As shown in the figures, an inner circumference of the connecting member flange may be spaced apart from an outer circumference of the water inlet periphery 222b. A sealing plug 225 is may be integrally connected to the connecting member 224 via a flexible connecting portion 226. The connecting member 224 can also be called "overmolded part", which refers to a material which is usually formed by injection molding of a thermoplastic polymer. When the drainage device 20 is attached to a pool, the connecting member 224 provides a seal between the pipe body 221 and the pool. The inlet end 222 of the drainage pipe may be integrally formed with one or both of the water inlet periphery 222b and the connecting member 224, thereby simplifying the manufacturing process and reducing the cost. When the drainage device 20 is installed at the pool bottom 12, a part of the drainage device 20, such as the sealing plug 225, may extend inside the pool. As shown in FIG. 6, the connecting member 224 is fixed to an upper surface of the pool bottom 12, for example, by high-frequency welding, such that the water inlet 222a of the inlet end 222 can be opened or closed using the sealing plug 225. According to one or more example aspects, the drainage valve may further comprise a hard plug 227. As shown in FIG. 2c, the hard plug 227 may be disposed inside the sealing plug 225 to prevent the sealing performance of the drainage valve from being affected by the deformation of the sealing plug 225.

According to one example aspect, when the drainage pipe 22 of the drainage device 20 is installed at the pool bottom 12, the water inlet 222a will not be deformed by the connection of the connecting member 224, because the connecting member 224 is spaced apart from the water inlet periphery 222b. That is, as shown in FIGS. 2a-2d, there is a gap d between an inner circumferences of the connecting member 224 and an outer circumferences of the water inlet periphery 222b. In this way, when the connecting member 224 is high-frequency welded to the pool bottom 12, the water inlet 222a is not affected by the connecting member 224, and the shape of the water inlet is maintained, thereby avoiding water leakage resulting from a deformation of the water inlet 222a defeating a seal between the water inlet 222a and the sealing plug 225.

According to another example aspect, in order to enable the drainage pipe 22 to be easily bent, the drainage pipe 22 may be made of a flexible material such as, but not limited to a thermoplastic elastomer (TPE), a thermoplastic resin which deforms easily and is resistant to wear, such as polyvinyl chloride (PVC), thermoplastic polyurethane (TPU), vulcanized silicone, polyvinylidene fluoride (PVDF) or polytetrafluoroethylene (PTFE), and another plastic material, as would be understood by one of skill in the art.

According to an example embodiment, though the drainage pipe is made of a flexible material and may be flattened by the pool, normal drainage therethrough can be ensured, as described in more detail below.

According an example aspect, the drainage pipe holder 21 may be made of a hard material such that the position of the drainage pipe holder 21 stably supports the inlet end 222 of the drainage pipe 22 at the pool bottom 12. The inflexible structure of the drainage pipe holder 21 prevents the inlet end 222 of the drainage pipe 22 from being squeezed and deformed by the pool, and can also buffer the deformation of the material of the pool bottom near the water inlet. It should be understood that, as compared with the previously-discussed foregoing flexible material, the hard material described herein refers to a material that is not deformed easily and has a certain hardness and strength. The hard material described herein may include, but is, not limited to metal, cemented carbide, hard rubber, and another hard material as would be understood by one of skill in the art.

Figure 3A:
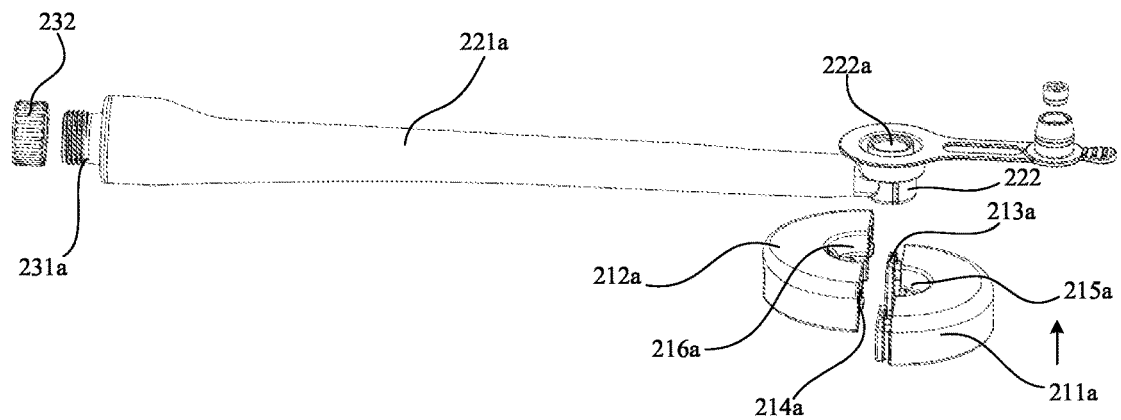
FIG. 3a is an external schematic diagram of a drainage device according to another example embodiment.
Figure 3B:
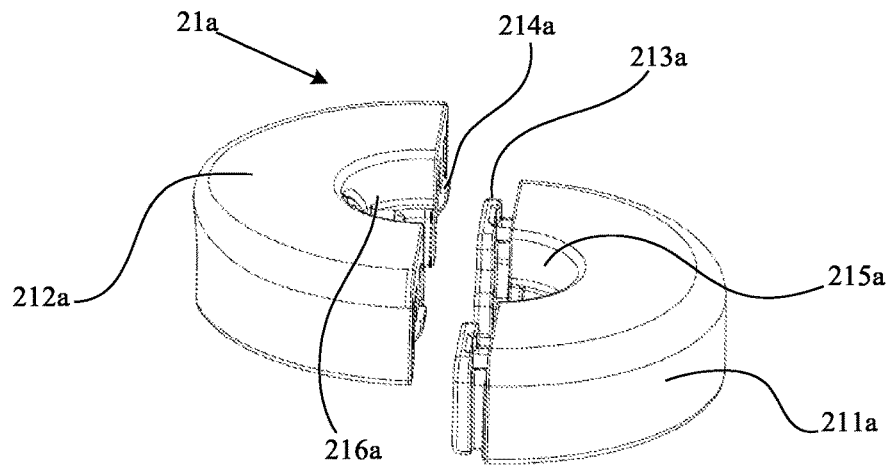

According to an example aspect, the drainage pipe holder 21, 21a may comprise a base 211, 211a for accommodating therewithin the inlet end 222 of the drainage pipe 22, and a plug plate 212, 212a for fixing the inlet end 222 to the base 211, 211a. According to an example aspect, the plug plate 212 may be fitted, in a plug-in manner, to the top or the bottom of the base 211 in a direction parallel to the extension of the drainage pipe 22. As shown in FIGS. 2a to 2d, the base 211 of the drainage pipe holder 21 is provided with a half notch 215 which allows the inlet end 222 of the drainage pipe 22 to be inserted therein. Accordingly, a shape of the half notch 215 may correspond to that of the inlet end. The plug plate 212 may also be correspondingly provided with a half notch 216. As the inlet end 222 is assembled into the base 211, the plug plate 212 can be inserted into the base 211 from the top of the base 211 in an insertion direction shown by the arrow in FIG. 2c, and the inlet end 222 is fixed in a space defined by the half notches 215, 216. The plug plate 212 may have an insertion groove or a protruding strip arranged in the insertion direction, such as a protruding strip 214 exemplarily shown in FIGS. 2c and 2d. Correspondingly, the base 211 may have a protruding strip or an insertion groove, such as an insertion groove 213 exemplarily shown in the figures. Through this structural design, the inlet end 222 of the drainage pipe 22 can be prevented from being loosened from the drainage pipe holder 21, such that the inlet end 222 can be firmly snap-fitted to the drainage pipe holder 21. According to an example aspect, as shown in FIGS. 3a and 3b, the plug plate 212a of the drainage pipe holder 21a may be fitted, in a plug-in manner, with the base 211a in a direction perpendicular to the extension of drainage pipe 22. Accordingly, the plug plate 212a may be provided with a half notch 216a having a shape corresponding to that of the inlet end, and may be provided with a snap groove or a snap fastener arranged in the insertion direction, such as a snap fastener 214a shown in the figures. The base 211a is correspondingly provided with a half notch 215a and a snap fastener or a snap groove, such as a snap groove 213a as shown. The inlet end 222 of the drainage pipe can be assembled into the half notch 216a formed in the plug plate 212a, and the base 211a then enables the snap groove 213a to be snap-fitted with the snap fastener 214a of the plug plate 212a in the insertion direction shown by the arrow in FIG. 3a, thereby fixing the inlet end 222 of the drainage pipe in the drainage pipe holder 21a.

Figure 4A:
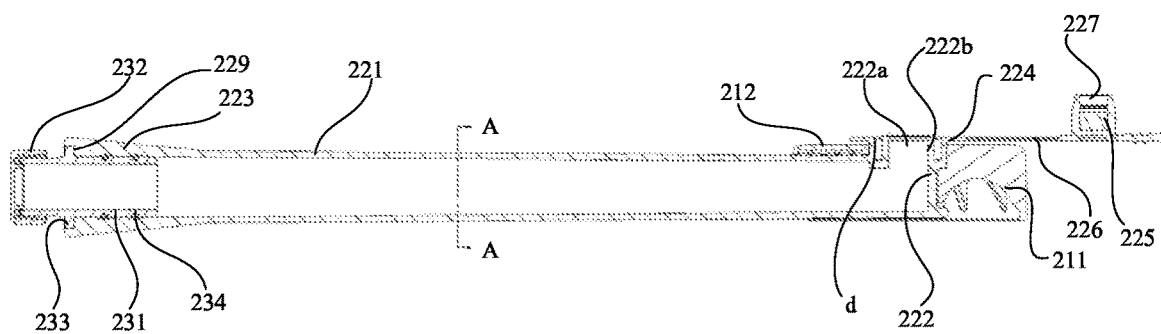
FIG. 4a is a schematic cross-sectional diagram of a drainage device according to another example embodiment.
Figure 7:
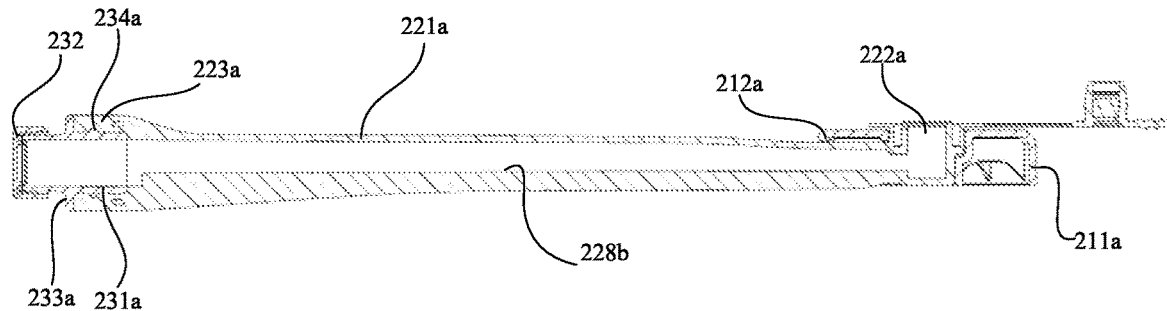
FIG. 7 is a schematic cross-sectional diagram of a drainage device according to another example embodiment.

According to an example embodiment, the drainage pipe connector 23 may be a hollow pipe 231 in fluid communication with the drainage pipe 22. One end of the drainage pipe connector is inserted, in a plug-in manner, into the outlet end 223 of the drainage pipe 22 via a sealing element 234; and the other end thereof is an end connection portion, for example, provided with threading to be adapted to another water pipe or a sealing cover 232. When the end connection portion is connected to the sealing cover 232, the sealing cover can be used to seal the drainage pipe 22 to prevent water in the pool from leaking out of the drainage pipe 22. When the end connection portion is connected to another water pipe, water can be discharged as required. Certainly, the water may also be directly discharged through the drainage pipe connector 23. As shown in FIGS. 2c and 4a, the drainage pipe connector 23 may also be provided with a raised peripheral rib 233 for being snap-fitted, in a form-fit manner, with a shoulder 229 arranged at the outlet end 223 of the drainage pipe 22, thereby stably connecting the drainage pipe connector 23 to the drainage pipe 22. As shown in FIG. 7, the drainage pipe connector may be connected, in a sealed manner, to the outlet end of the drainage pipe by means of injection molding. According to this example, the drainage pipe connector is a hollow pipe 231a and is optionally provided with a raised peripheral rib 233a, so as to be subjected to integral injection molding with the outlet end 223a of a pipe body 221a of the drainage pipe to form a fixing structure. An annular rib 234a is also optionally arranged on an outer wall of the hollow pipe 231a to further promote the connection and sealing effects.

It should be understood that the various example aspects of the drainage pipe connector and the drainage pipe holder described above can be combined and applied to different types of drainage pipes as would be understood by one of skill in the art. Various example embodiments described below are illustrated with reference to the foregoing one or more example embodiments, but are not limited thereby. That is, the following example embodiments can be combined with any of the foregoing example embodiments.

Figure 4B:
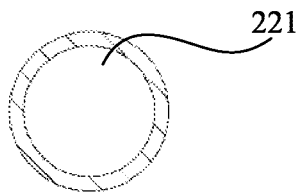

In an embodiment shown in FIGS. 4a and 4b, the pipe body 221 may be made of a flexible material. Since a gap d is formed between the water inlet periphery 222b and the connecting member 224, the water inlet 222a will not likely suffer deformation defects during the high-frequency welding of the connecting member 224 and the pool bottom. The drainage pipe connector may be connected to the drainage pipe in a plug-in manner as shown in FIG. 2c, and the drainage pipe holder may be fixedly connected, by using the plug plate 212 shown in FIGS. 2c and 2d, in a plug-in manner to the base 211 in a direction parallel to the extension of the drainage pipe.

According to this example aspect, the pipe body 221 is made of a flexible material, such that the drainage device has a certain bendability, which makes the whole package size smaller and reduces the cost. It should be understood that the flexible material described herein refers to a thermoplastic elastomer (TPE) or a thermoplastic resin which deforms easily and is resistant to wear, such as, but not limited to, polyvinyl chloride (PVC), thermoplastic polyurethane (TPU), vulcanized silicone, polyvinylidene fluoride (PVDF), polytetrafluoroethylene (PTFE), and other plastic materials with similar properties, as would be understood by one of skill in the art.

Due to the pipe body 221 being made of a flexible material, the drainage device may be easily squeezed and deformed by the pool bottom when water is stored in the pool. To facilitate smooth drainage of the drainage device, optionally, the drainage pipe 22 may be internally provided with a reinforcing member arranged in the lengthwise direction. The reinforcing member may extend over at least part of the length of the drainage pipe 22, such that if the pipe body 221 is squeezed by the pool, the reinforcing member can prevent the inner walls of the pipe body 221 from adhering to each other and possibly preventing fluid flow therebetween.

According to another example aspect, the reinforcing member may be a rib integrally formed on the inner wall of the pipe body 221, and when squeezed, the rib may enable a gap to remain inside the pipe body 221 to facilitate smooth drainage. According to another example aspect, the reinforcing member may be a supporting pipe nested inside the pipe body, and the material hardness of the supporting pipe may be greater than that of the pipe body 221, such that not only can the pipe body 221 be supported to have a certain rigidity to aid in preventing the inner walls from completely adhering to each other, but also the bendability of the drainage pipe body can be facilitated.

Figure 5A:
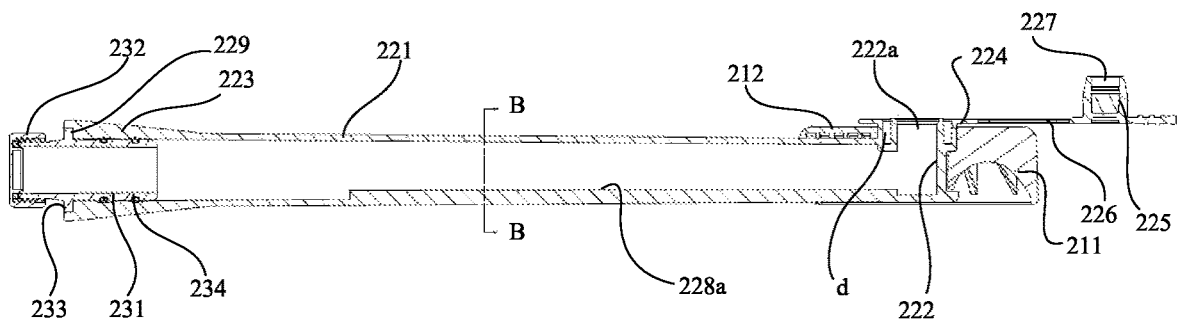
FIG. 5a is a schematic cross-sectional diagram of a drainage device according to another example embodiment.
Figure 5B:
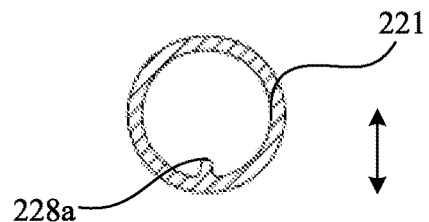

FIGS. 5a to 6 show a drainage device according to another example embodiment and its application to a pool bottom. This example embodiment is different from the foregoing example embodiment in that the inner wall of the pipe body 221 may be provided with a protruding rib 228a, and the rib 228a may extend along most of the inner wall and protrude at least in the deformation direction of the pool bottom 12, i.e., in the direction of arrows in FIGS. 5b and 6. In this direction, one rib 228a, as shown, located at the bottom or a pair of ribs symmetrically arranged may be optionally provided, or the rib 228a may be arranged at a top position near the pool bottom 12.

FIG. 7 shows a drainage device according to another example embodiment. In this example embodiment, the inner wall of the pipe body 221 is provided with a protruding rib 228b. The drainage pipe connector may be connected to the drainage pipe by means of injection molding with the outlet end of the drainage pipe as described above, while the drainage pipe holder may be fixedly connected, by using the plug plate 212a shown in FIGS. 3a and 3b, to the base 211a in a plug-in manner in a direction perpendicular to the drainage pipe. Optionally, the rib 228b may extend substantially from the inlet end 222 to the outlet end 223a.

Figure 8A:
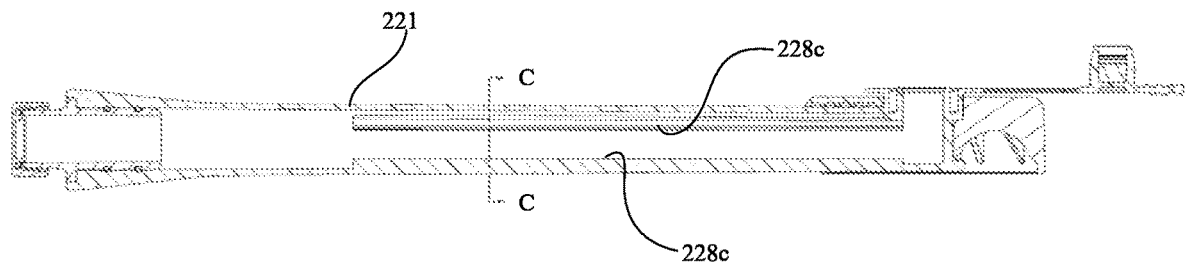
FIG. 8a is a schematic cross-sectional diagram of a drainage device according to another example embodiment.
Figure 8B:
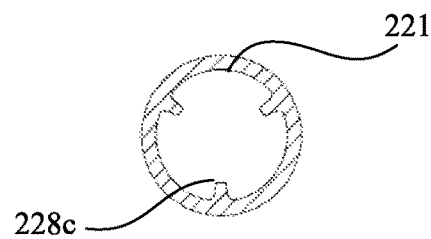

In another example embodiment shown in FIGS. 8a and 8b, the drainage pipe connector and the drainage pipe holder are similar to those of the example embodiments shown in FIGS. 5a and 5b. The difference is that the inner wall of the pipe body 221 may be provided with a plurality of protruding ribs 228c, for example, three shown in the figures, and the plurality of ribs 228c may be evenly spaced along the inner wall of the pipe body 221. It can be seen from FIGS. 5b and 8b that in these two example embodiments, the cross sections of the ribs 228a, 228c may be substantially in a U shape.

Figure 9A:
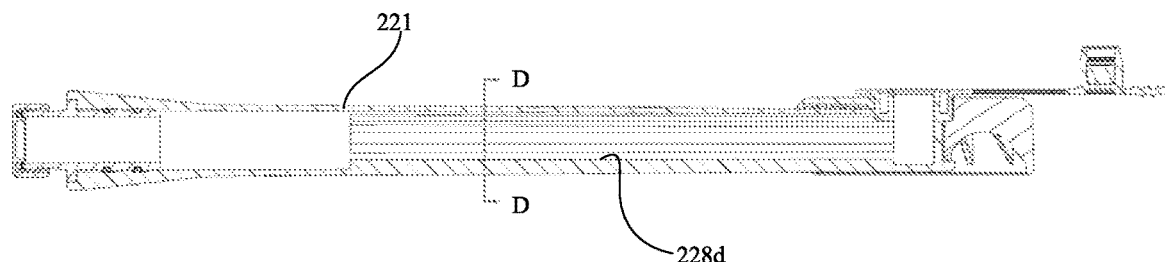
FIG. 9a is a schematic cross-sectional diagram of a drainage device according to another example embodiment.
Figure 9B:
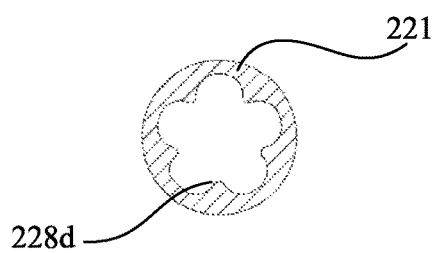

In another example embodiment shown in FIGS. 9a and 9b, the drainage pipe connector and the drainage pipe holder are similar to those of the example embodiments shown in FIGS. 5a and 5b. The difference is that the inner wall of the pipe body 221 may be provided with a plurality of protruding ribs 228d evenly spaced, for example, five shown in the figures. The cross section of the ribs 228d may be, for example, substantially in a V shape, thereby forming a flower shape shown in the figure. However, it should be understood that although the pipe body 221 is shown as having a circular cross section, other suitable cross-sectional shapes such as an oval shape and a polygonal shape may alternately be used. Therefore, the cross-sectional shape of the rib is not limited to the foregoing U shape or V shape, and suitable cross-sectional shapes such as an arc shape or even a square shape may alternately be used.

Figure 10A:
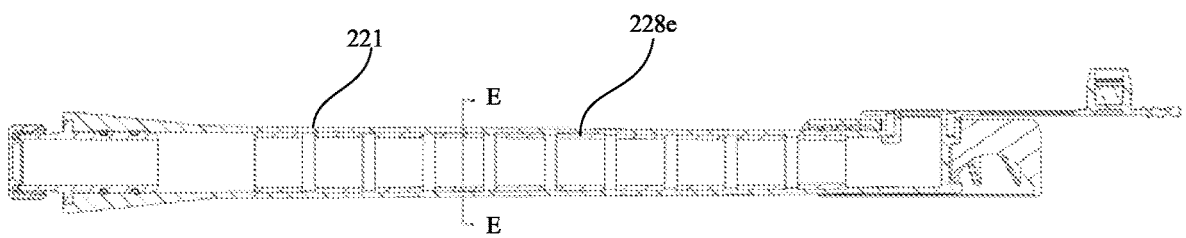
FIG. 10a is a schematic cross-sectional diagram of a drainage device according to another example embodiment of the present invention.
Figure 10B:
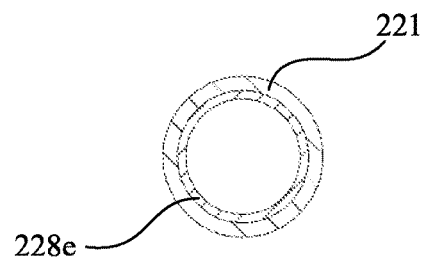

According to one or more example aspects, if the flexible material of the pipe body 221 is selected to have a relatively large flexibility, it may be desirable to provide a supporting pipe on the inner wall of the pipe body 221, and the material hardness of the supporting pipe may be greater than that of the pipe body. In another example embodiment shown in FIGS. 10a and 10b, the drainage pipe connector and the drainage pipe holder are similar to those of the example embodiments shown in FIGS. 5a and 5b. The difference is that a plurality of supporting pipes 228e may be embedded along most of the length of the pipe body 221, and the supporting pipes 228e may have the same or different lengths, or the same or different wall thicknesses. In addition, the spacing between adjacent supporting pipes 228e may also be set to be the same or different, and the bendability of the pipe body can be realized by means of the distance between the plurality of supporting pipes, thereby meeting different supporting requirements and bending requirements. In this case, the supporting pipes 228e may be made of a hard material.

Figure 11A:
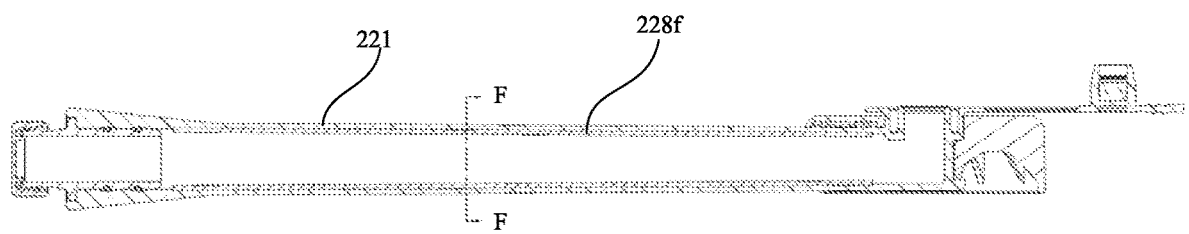
FIG. 11a is a schematic cross-sectional diagram of a drainage device according to another example embodiment.
Figure 11B:
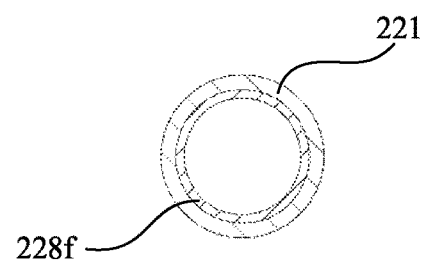

In another example embodiment shown in FIGS. 11a and 11b, similar to that of the foregoing example embodiment, the inner wall of the pipe body 221 may be provided with a supporting pipe. The difference is that the supporting pipe 228f in this example embodiment may be a single supporting pipe, and a soft supporting pipe with a hardness greater than that of the pipe body 221 may be used. The supporting pipe 228f may extend from the inlet end to the outlet end, so as to provide sufficient support for the pipe body 221 and make the pipe body have bendability.

According to one or more example embodiments as described herein, a drainage device of the present invention may facilitate the smooth drainage of the drainage pipe, and may facilitate prevention of the water inlet at the inlet end from being deformed due to the installation of the drainage valve or the inner walls of the pipe body from adhering to each other due to the squeezing by the pool during use. The drainage device may be suitable for use in conjunction with any of various above-ground pools. It should be understood that the example embodiments shown in the drawings only show the optional shapes, sizes and arrangements of various optional components of the drainage device, but they are only for illustration and not for limitation. Other shapes, sizes and arrangements may be employed without departing from the spirit and scope of the example embodiments.

Thus, it may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A drainage device for an above-ground pool, the drainage device comprising:
   a drainage pipe having an inlet end and an outlet end; and
   a drainage valve, connected to the inlet end of the drainage pipe, and comprising:
      a water inlet periphery defining a water inlet in fluid communication with the inlet end of the drainage pipe, and
      a connecting member disposed circumferentially around the water inlet periphery and radially spaced apart from the water inlet periphery.

2. The drainage device according to claim 1, wherein the connecting member is formed by injection molding around the water inlet periphery.

3. The drainage device according to claim 1, further comprising:
   a drainage pipe connector having an inlet end configured to be connected to the outlet end of the drainage pipe and an outlet end opposite the inlet end.

4. The drainage device according to claim 1, further comprising:
   a drainage pipe holder connected to the inlet end of the drainage pipe, the drainage pipe holder formed of a material having a hardness greater than a hardness of the drainage pipe;
   the drainage pipe holder comprising:
      a base configured to accommodate therein the water inlet, and
      a plug plate fixing the water inlet to the base.

5. The drainage device according to claim 4,
   wherein the plug plate extends in a direction substantially parallel to a length of the drainage pipe and is fitted to the base in an insertion direction substantially parallel to the length of the drainage pipe, and
   wherein one of the plug plate and the base comprises an insertion groove extending in the insertion direction, and another of the plug plate and the base comprises a protruding strip extending in the insertion direction.

6. The drainage device according to claim 4,
   wherein the plug plate extends in a direction substantially perpendicular to a length of the drainage pipe and is fitted to the base in an insertion direction substantially perpendicular to the length of the drainage pipe, and
   wherein one of the plug plate and the base comprises a snap groove extending in the insertion direction, and another of the plug plate and the base comprises a snap fastener extending in the insertion direction.

7. The drainage device according to claim 1, further comprising:

a reinforcing member disposed within the drainage pipe and extending in a lengthwise direction along a length of an inner wall of the drainage pipe.

8. The drainage device according to claim 7, wherein the reinforcing member comprises a rib integrally formed with the inner wall of the drainage pipe, the rib protruding radially inward from the inner wall of the drainage pipe.

9. The drainage device according to claim 8, wherein the reinforcing member comprises a plurality of evenly-spaced ribs protruding inward from the inner wall of the drainage pipe.

10. The drainage device according to claim 7, wherein the reinforcing member comprises a supporting pipe embedded in the inner wall of the drainage pipe, wherein a hardness of the supporting pipe is greater than a hardness of the drainage pipe.

11. An above-ground pool, comprising:
a pool bottom;
a pool wall surrounding the pool bottom, the pool wall and the pool bottom together defining a water cavity; and
the drainage device according to claim 1 installed at the pool bottom.

* * * * *